(12) United States Patent
Rajewski

(10) Patent No.: US 6,752,583 B2
(45) Date of Patent: Jun. 22, 2004

(54) MOBILE MATERIAL SEGREGATION AND DELIVERY APPARATUS

(75) Inventor: David E. Rajewski, Spokane, WA (US)

(73) Assignee: Shredfast, Inc., Airway Heights, WA (US)

( * ) Notice: Subject to any disclaimer, the term of this patent is extended or adjusted under 35 U.S.C. 154(b) by 0 days.

(21) Appl. No.: 09/810,585

(22) Filed: Mar. 15, 2001

(65) Prior Publication Data

US 2002/0131851 A1 Sep. 19, 2002

(51) Int. Cl.[7] ............................................. B65G 69/04
(52) U.S. Cl. ........................................................ 414/502
(58) Field of Search ................................. 414/268, 269, 414/272, 475, 489, 502, 503, 509, 294, 351, 352; 198/574, 603, 369.7

(56) References Cited

U.S. PATENT DOCUMENTS

| | | | | |
|---|---|---|---|---|
| 2,589,988 A | * | 3/1952 | Bruno | 193/5 |
| 2,925,184 A | * | 2/1960 | Powischill et al. | 198/349 |
| 4,119,193 A | * | 10/1978 | Smith et al. | 119/57.7 |
| 4,429,517 A | * | 2/1984 | Lohrentz et al. | 56/181 |
| 4,948,321 A | * | 8/1990 | Wilding et al. | 198/347.3 |
| 5,324,158 A | * | 6/1994 | Shah et al. | 198/574 |
| 5,413,448 A | * | 5/1995 | Peshkin | 414/338 |

* cited by examiner

Primary Examiner—Eileen D. Lillis
Assistant Examiner—Charles A. Fox
(74) Attorney, Agent, or Firm—Wells St. John, P.S.

(57) ABSTRACT

A material segregation and delivery apparatus is described in which a frame carries a succession of material receiving containers. A material intake station is situated above one of the material receiving containers. A number of endless belt conveyors extend elevationally over the containers. At least one driver is operable to move the conveyor working flights to transport received materials. The conveyors are selectively movable (a) toward one another to a substantially joined condition in which the conveyors operably combine to form a substantially single extent, and (b) away from one another to define discharge openings over selected ones of the containers.

4 Claims, 3 Drawing Sheets

MOBILE MATERIAL SEGREGATION AND DELIVERY APPARATUS

TECHNICAL FIELD

The present invention relates to segregation of conveyor delivered materials, and more particularly to segregation in which the conveyors are used both for transport of the materials and for segregating the delivered materials at selected discharge stations.

BACKGROUND OF THE INVENTION

Segregation of materials and collection in separate bins or containers is a task often accomplished manually, or by individual delivery devices that lead from an input source to the collection sites.

In one example, it is growing more common to find material collection vehicles such as shredding or recycle trucks with a transported collection bin divided into several compartments, each for receiving a different material. The material being collected, however, is not typically initially segregated; and the attendant must move from one bin to the next to segregate the materials and deposit them in the proper bins. This is time consuming and in an area where profitability margins are extremely slim, greater efficiency is desirable.

Another problem area exists in collection of materials such as shredded paper that may be easily picked up in gusts of wind from otherwise open collection bins. If the bins are covered to avoid this circumstance, a collection attendant will likely be charged with the added task of opening each bin before depositing the collected, segregated materials. This adds to the time consuming process and further degrades efficiency.

A need has therefor remained for an effective, efficient way to segregate and collect disparate materials, especially in material collection vehicles. The present invention was developed as a solution to such need.

An objective of the present invention is thus to provide a material segregation and delivery apparatus will permit infeed of materials at a single feed station for delivery to several collection containers.

A further objective is to provide such an apparatus that may be mounted on a transport vehicle.

These and still further objectives and advantages will be understood from the following disclosure which, taken with the drawings and appended claims, set forth exemplary embodiments of the present invention.

BRIEF DESCRIPTION OF THE DRAWINGS

Preferred embodiments of the invention are described below with reference to the following accompanying drawings.

DESCRIPTION OF PREFERRED EMBODIMENTS

Figure 1:
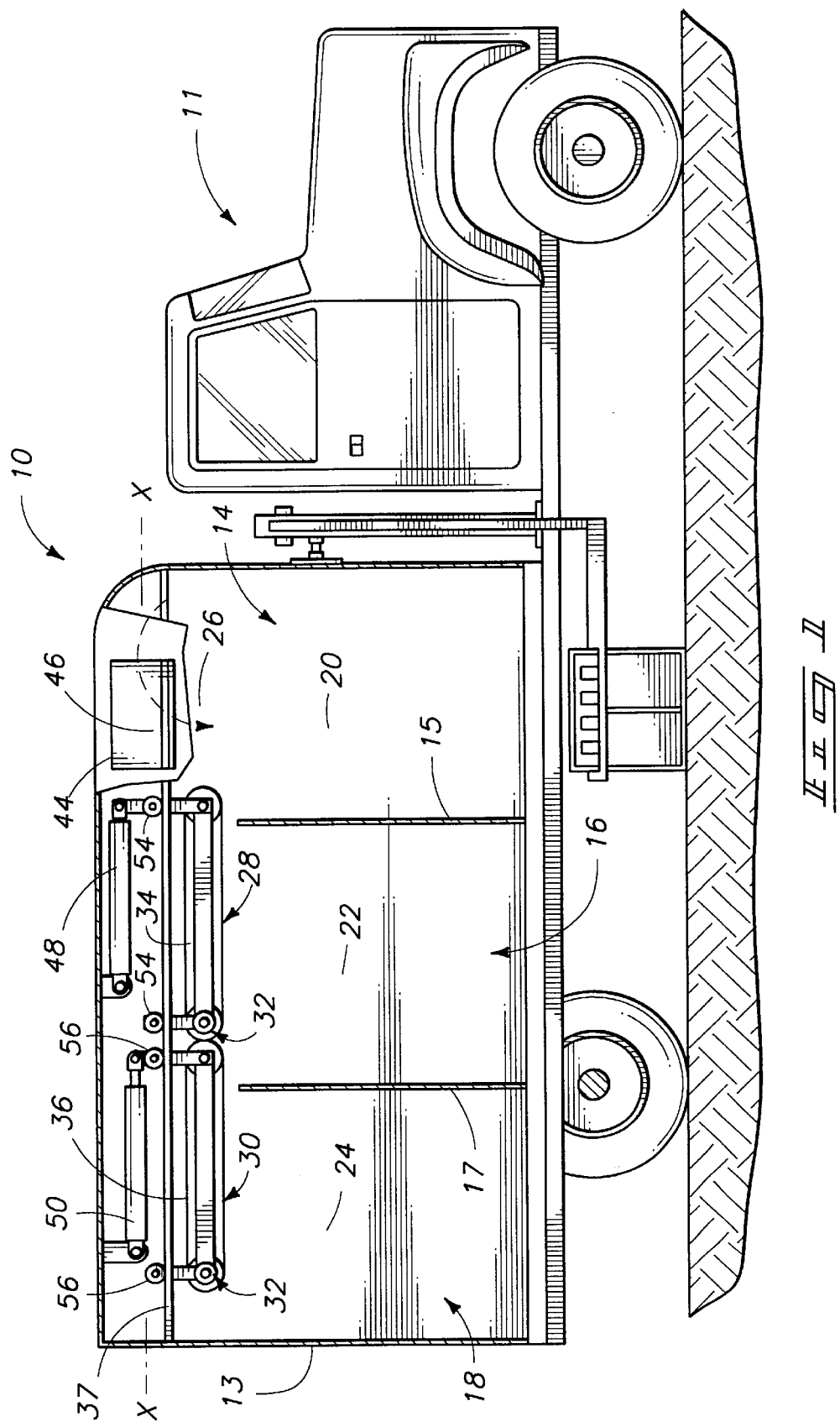
FIG. 1 is a side elevation view of a preferred, exemplary form of the present material segregation and delivery apparatus mounted on a transport vehicle with the material collection bin shown in cross-section to reveal elements therein.

This disclosure of the invention is submitted in furtherance of the constitutional purposes of the U.S. Patent Laws "to promote the progress of science and useful arts" (Article 1, Section 8).

It should be noted that fasteners, materials, drive mechanisms, control circuitry, manufacturing and other means and components utilized to make and implement this invention are known and used in the field of the invention described, and their exact nature or type is not necessary for an understanding and use of the invention by a person skilled in the art or science. As such, specific details of such means and components will not be discussed in great detail herein.

Furthermore, the various components shown or described herein for any specific application of this invention can be varied or altered as anticipated by this invention and the practice of a specific application or embodiment of any element may already be widely known or used in the art or by persons skilled in the art or science.

The terms "a", "an", and "the" as used in the claims and elsewhere herein are used in conformance with long-standing claim drafting practice and not in a limiting way. Unless specifically set forth herein, the terms "a", "an", and "the" are not limited to one of such elements, but instead mean "at least one".

General Description

Before describing details of preferred forms of the invention in detail, general descriptions of aspects of the invention will be given.

One aspect of the invention involves a material segregation and delivery apparatus 10 which includes a frame 12, and a succession of material receiving containers 14, 16, 18 on the frame, each including an upward opening 20, 22, 24. A material intake station 26 is situated above one of the material receiving containers 20, 22, or 24. A number of endless belt conveyors 28, 30 are mounted to the frame in alignment along a line X and extending elevationally over the containers 14, 16, 18 from the intake station 26. At least one driver 32 is connected to the conveyors 28, 30 and is operable to move working flights 34 of the respective conveyors 28, 30 to transport received materials along the working flights 34, 36. The conveyors 28, 30 are selectively movable (a) toward one another to a substantially joined condition in which the conveyors operably combine to form a substantially single extent along the line X from the intake station, and (b) away from one another to define discharge openings 38, 40, 42 over selected ones of the containers 14, 16, 18.

In another aspect of the invention, the mobile material segregation and delivery apparatus 10 includes a transport vehicle 11. The elongated frame 12 is mounted on the transport vehicle 11. A bin 13 defining a succession of the individual material receiving containers 14, 16, 18; which are arranged in alignment along the frame 12. Each container includes an upward opening 20, 22, and 24. A material intake hopper 44 is provided the frame 12 with a discharge 46 positioned at the intake station 26 above one of the material receiving containers 18, 20, 22. A number of endless belt conveyors 28, 30, with working flights 34, 36 are mounted to the frame 12 in alignment along line X and extending elevationally over the containers 14, 16, 18. At least one driver 32 is connected to the conveyors 28, 30 and is operable to move working flights of the conveyors to transport received materials along the working flights. The conveyors 28, 30, 32 are movable toward and away from one another along said line X to selectively define discharge openings over selected ones of the containers 14, 16, 18.

In a further aspect, the invention includes a material segregation and delivery apparatus 10 in which an elongated frame 12 mounts a bin 13 with internal bulkheads 15, 17 that define a succession of the containers 14, 16, 18 which are individually arranged and in alignment along the frame 12. Each container includes an upward opening 20, 22, 24. A material intake hopper 44 is disposed along the frame 12 with its discharge 46 positioned at the intake station 26 above a first one 14 of the material receiving containers. Endless belt conveyors 28, 30 with upwardly facing working flights 34, 36 are mounted to guides 37 on the frame for independent movement along the guides 37 over the containers 14, 16, 18; along line X and extending elevationally over the containers 14, 16, 18 from the first container 14. Each conveyor 28, 30 is operated to move working flights 34, 36 to transport received materials. The conveyors 28, 30 are movable toward and away from one another along the line X to selectively define discharge openings 38, 40, 42 over selected ones of the containers 14, 16, 18.

Detailed Description

Referring in greater detail to specific exemplary components of a preferred form of the apparatus, attention is drawn to FIG. 1. There it is shown that the frame rests on a transport vehicle which may be a truck as exemplified by the drawing, but which may be another form of vehicle such as a ship or railway car. Further, as indicated separately in other Figures, the apparatus 10 may be self-contained (not mounted to a vehicle as a stationary or portable collection facility.

It should be understood at this point that the present apparatus, as indicated above, is not limited to use on a vehicle, nor is its use limited to any particular material to be collected, although the exemplified conveyors lend themselves well to use with solid materials.

It is further pointed out that although three containers 14, 16, 18 are shown, more could be utilized. Further, more of the conveyors 28, 30 could be used. Generally speaking, the number of conveyors used along line X may be one less than the number of containers below. Thus, for example, four conveyors could be mounted in a manner similar to that shown herein, over five containers arranged in line below in a manner also similar to that exemplified herein. Of course, appropriate arrangements for increased number of actuators 48, 50 and controls 52 would be used as well. Thus it is re-emphasized that the example illustrated is just that; an example, and that various modifications may be made within the intended scope of this disclosure.

It may be noted that the bin 13 is divided by bulkheads 15, 17 into three separate containers. It should be understood, however, that the containers could be independent, discrete units that could be moved relative to one another. The illustrated, covered bin, is simply exemplary of a form that would lend itself well to use on a transport vehicle.

The illustrated belt conveyors 28, 30 are shown in simplified form, mounted by wheels 54, 56 to the guide 37. Other forms of guides and wheel supports could be used. For example, the guides could be provided in the form of elongated shafts (not shown) and the wheels could be replaced by equivalent mobile supports such as bushings or bearings slidably mounted to the shafts.

It is also pointed out that the exemplary actuators 48, 50 are illustrated as ram cylinders, but that other linear actuator or driver arrangements could be used. Examples of equivalents may include but are not limited to, rack and pinion arrangements; chain and sprocket connections, belt and pulley, and mechanical bar linkages.

At best one of the actuators 48 or 50 is connected between an associated conveyor 28 or 30 and the frame 12 (by way of the bin 13). In the example illustrated, both actuators are mounted at one end to the bin and at another end to an associated conveyor. Another arrangement is possible, however, in which one conveyor would be connected by way of an actuator to the frame or bin, and the remaining actuator(s) would be connected between successive conveyors along the line X. In either instance, the actuators may be controlled by circuitry that is not shown but that is well within the capability of control circuit designers, to act independently or in unison in order to move the conveyors in a desired manner along the guides 37.

In the illustrated example, the actuator 48 is a linear-type actuator such as a hydraulic or pneumatic ram cylinder connected between the first conveyor 28 and the frame. Extension of the cylinder will cause movement of the conveyor 28 toward a position covering the discharge opening 38 (FIG. 4) over the first container 20 (FIGS. 2, 3 and 5, 6) to intercept materials at the intake station 26 that have been deposited through the hopper chute 44. Retraction of the cylinder will cause movement of the conveyor 28 away from the intake station (FIGS. 1 and 4) so that materials fed through the hopper chute 44 will simply drop through the first discharge opening 38 and into the container 20 below.

Figure 3:
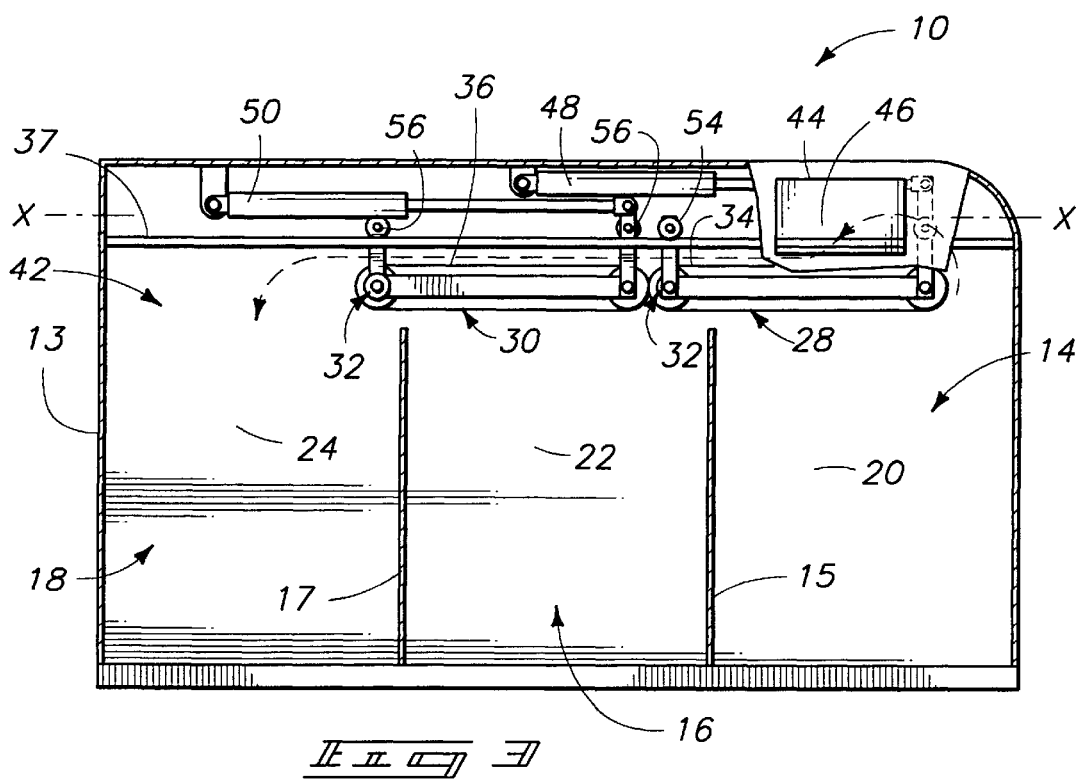
FIG. 3 is a view similar to FIG. 2 only showing the conveyor elements in another operational position.
Figure 6:
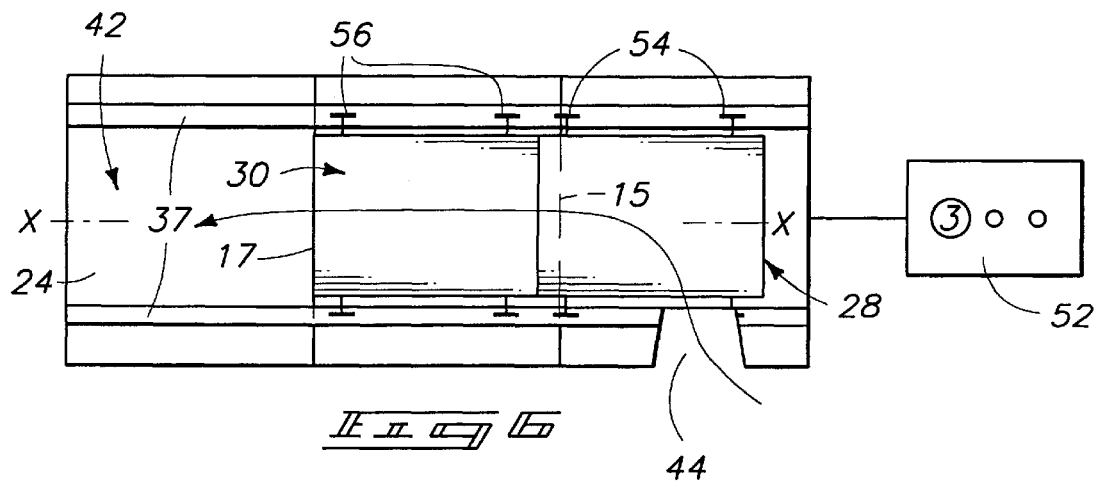
FIG. 6 is a schematic plan view similar to FIGS. 4 and 5 only showing elements in positions corresponding substantially to those shown in FIG. 3.

Similarly, actuator 50 may be mounted as illustrated to extend and move the second conveyor toward the first conveyor such that the two conveyors become a substantially single extent with their working flights 34, 36 cooperating to move material along the line X from the infeed station 26 to the third container 24 (FIGS. 3, 6).

Figure 2:
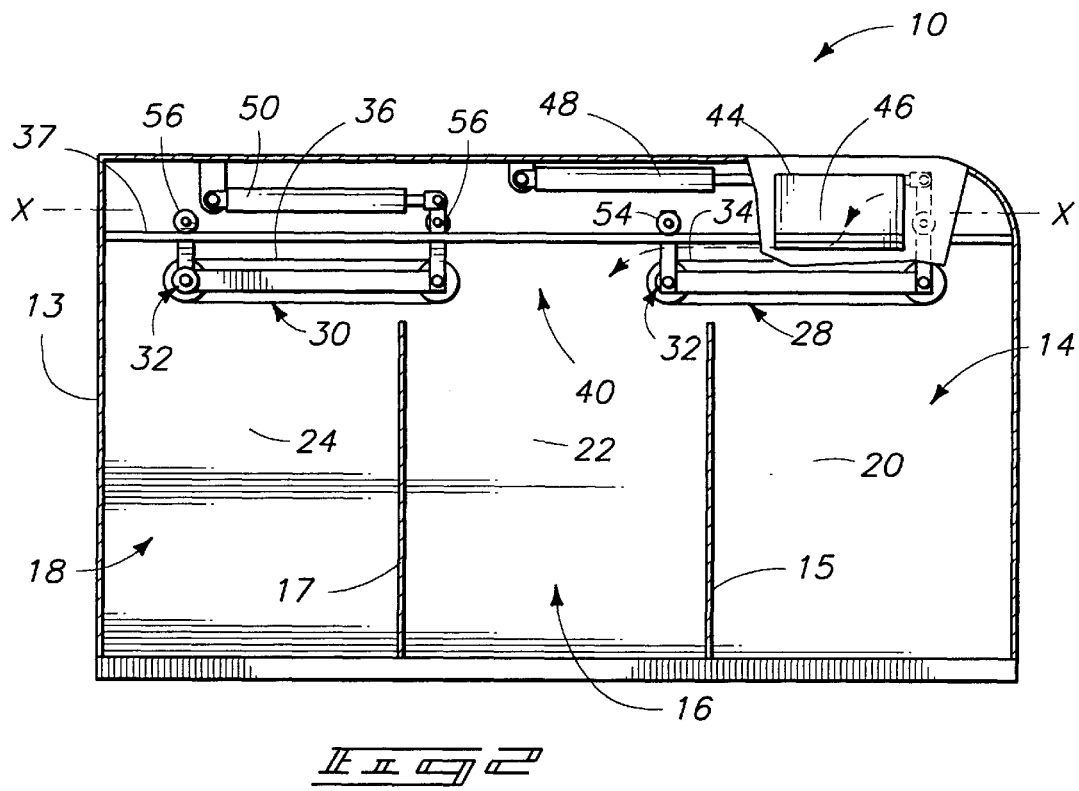
FIG. 2 is a view similar to FIG. 1 but without the vehicle being shown and with the conveyor components within the bin being shown in different operational position.

Retraction of the actuator 50 will cause the second conveyor 30 to move along the guides 37 away from the first conveyor and to a position exposing the discharge opening 40 (FIG. 5) over the second container 22. In this position, the conveyor 30 will cover the third container substantially as shown in FIG. 2.

It is pointed out at this time that the location of the hopper chute could be provided over any one of the containers, and that the illustrated location is shown only as an example. For instance, the hopper chute could be situated over the second container. To accommodate this, the direction of driver 32 for the first conveyor would be reversed, so material delivered at the central hopper position could be selectively delivered to the first container 20. The second conveyor in this arrangement could function as indicated above for the illustrated example.

The drivers 32 may be any appropriate form of motor (electric, hydraulic or pneumatic) conventionally used for operating a conveyor. Further, the conveyor belting and support may also be of conventional known forms.

Figure 4:
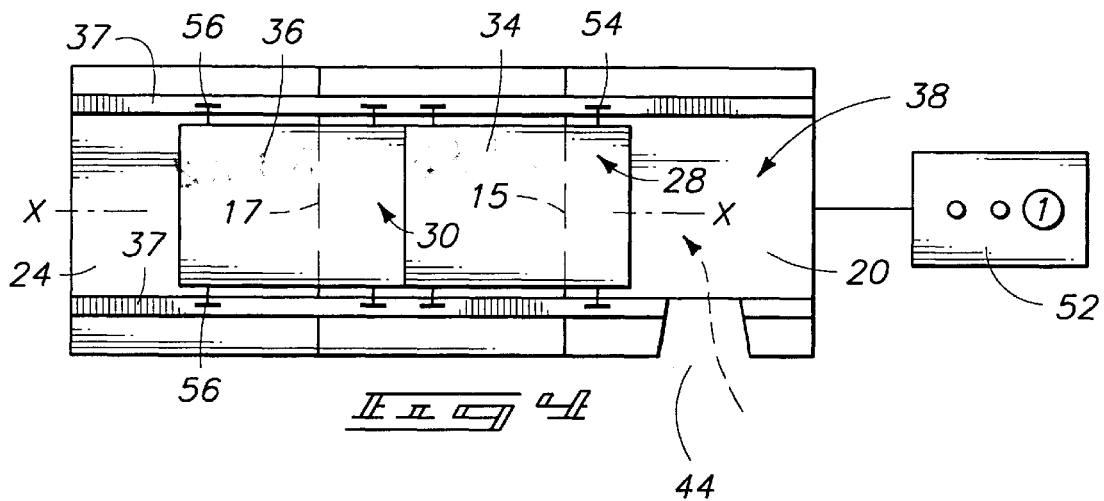
FIG. 4 is a schematic plan view showing containers and conveyor positions corresponding substantially to the relative positions shown in FIG. 1.
Figure 5:
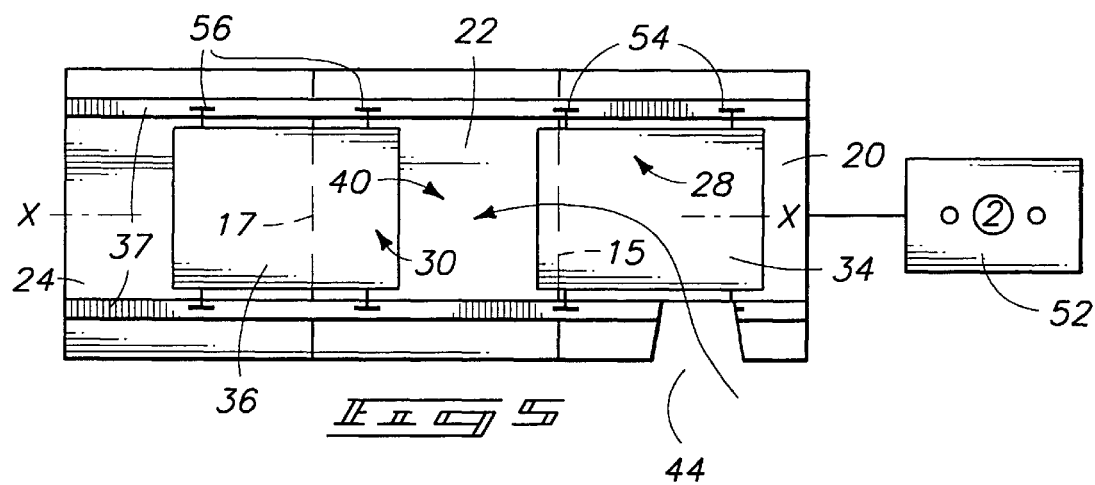
FIG. 5 is a schematic plan view similar to FIG. 4 only showing the elements in positions corresponding substantially to those shown in FIG. 2.

Controls 52 which are shown in schematic form in FIGS. 4–6 may be, as noted above, of an appropriate design that is not shown but well within the skill of a control designer. Controls 52 may be provided to enable an operator to activate the conveyors and actuators such that materials delivered at the single infeed station may be selectively delivered to any one of the containers 20, 22 or 24. A preferred control arrangement will be discussed in conjunction with the following description of operation of the apparatus.

For purposes of description, assume the intended materials to be collected are glass, which is to be accumulated in the first container 20; cans, which are to be collected in the second container 22; and plastic which is to be accumulated in the third container 24. Also assume a starting condition as shown in FIGS. 1 and 4.

If a user desires to collect a volume of cans, he or she simply operates the appropriate control 52 to select the second container 22. This choice is indicated at numeral 2 on the control 52 shown in FIG. 5. When this arrangement is selected, the control 52 will operate the first actuator 48 to move the first conveyor toward the first container, thereby exposing the discharge opening 40 to the second container, and positioning the conveyor under the hopper chute. The associated driver is also activated so that any cans that are fed through the hopper chute will be received on the working flight 34 and be delivered to the second container.

Next, assume the operator has a volume of plastic to be delivered to the third container 24. He or she may simply operate the control 52 to select that container and the appropriate actuators and drivers will be set into motion. The actuator 50 will be extended to move the second conveyor 30 toward the previously positioned first conveyor 28 (FIG. 6) thereby substantially operably joining the two conveyors so that plastic fed through the hopper chute 44 will be carried along the line from the infeed station to be discharged through the third and presently exposed opening 42 to the third containers 18. The conveyors automatically cover access to the first two containers so any plastic received through the hopper will only be fed to the third container.

Now let us say the operator has moved the vehicle to a new location where there is another volume of glass for collection. He or she simply operates the control to select the first container and the appropriate actuators are set into motion. The actuators 48, 50 (being previously set to position the conveyors in the condition shown in FIG. 6) will both extend, thereby shifting the conveyors back to the starting position shown by FIGS. 1 and 4. Access is now gained to the first container by way of the same hopper chute.

It is pointed out that the operator need feed selected materials through from a single location through a single hopper, and that the materials may be delivered by the conveyors to any one of the containers. It is also pointed out that the hopper chute may be the only access opening in an otherwise covered bin so the received materials will be protected from weather and wind.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A material segregation and delivery apparatus, comprising:
    a frame;
    a succession of material receiving containers on the frame, each including an upward opening;
    a material intake station above one of the material receiving containers;
    a number of endless belt conveyors mounted to the frame in alignment along a line and extending elevationally over the containers from the intake station;
    at least one driver connected to the conveyors and operable to move working flights of the conveyors to transport received materials along the working flights;
    wherein the conveyors are selectively movable (a) toward one another to a substantially joined condition in which the conveyors operably combine to form a substantially single extent along said line from the intake station, and (b) away from one another to define discharge openings over selected ones of the containers; and
    wherein three containers are provided along said line and two conveyors are positioned above the three containers.

2. A material segregation and delivery apparatus, comprising:
    a frame;
    a succession of material receiving containers on the frame, each including an upward opening;
    a material intake station above one of the material receiving containers;
    a number of endless belt conveyors mounted to the frame in alignment along a line and extending elevationally over the containers from the intake station;
    at least one driver connected to the conveyors and operable to move working flights of the conveyors to transport received materials along the working flights;
    wherein the conveyors are selectively movable (a) toward one another to a substantially joined condition in which the conveyors operably combine to form a substantially single extent along said line from the intake station, and (b) away from one another to define discharge openings over selected ones of the containers;
    wherein three containers are provided along said line and two conveyors are positioned above the three containers; and
    wherein three containers are provided along said line and two conveyors are positioned above the three containers, and wherein the conveyors are movable by action of a pair of linear actuators connecting the respective conveyors and the frame.

3. A material segregation and delivery apparatus, comprising:
    a frame;
    a succession of material receiving containers on the frame, each including an upward opening;
    a material intake station above one of the material receiving containers;
    a number of endless belt conveyors mounted to the frame in alignment along a line and extending elevationally over the containers from the intake station;
    wherein the number of conveyors is at least one less than the number of containers;
    at least one driver connected to the conveyors and operable to move working flights of the conveyors to transport received material along the working flights; and wherein the conveyors are selectively movable (a) toward one another to a substantially joined condition in which the conveyors operably combine to form a substantially single extent along said line from the intake station, and (b) away from one another to define discharge openings over selected ones of the containers.

4. A mobile material segregation and delivery apparatus, comprising:

a transport vehicle;

an elongated frame mounted on the transport vehicle;

a bin defining a succession of individual material receiving containers arranged in alignment along the frame;

wherein each container includes an upward opening;

a material intake hopper on the frame with a discharge positioned at an intake station above one of the material receiving containers;

a number of endless belt conveyors with working flights mounted to the frame in alignment along a line and extending elevationally over the containers;

wherein the number of conveyors is at least one less than the number of containers;

at least one driver connected to the conveyors and operable to move working flights of the conveyors to transport received material along the working flights; and wherein the conveyors are movable toward and away from one another along said line to selectively define discharge openings over selected ones of the containers.

* * * * *